US012768587B2

(12) United States Patent
Kapse et al.

(10) Patent No.: US 12,768,587 B2
(45) Date of Patent: Oct. 20, 2026

(54) PREDICTING AND ENHANCING SHELF LIFE OF PRODUCE IN STORAGE

(71) Applicant: Tata Consultancy Services Limited, Mumbai (IN)

(72) Inventors: Shrikant Arjunrao Kapse, Pune (IN); Hrishikesh Nilkanth Kulkarni, Pune (IN); Shankar Balajirao Kausley, Pune (IN); Dilshad Ahmad, Pune (IN); Beena Rai, Pune (IN); Priya Kedia, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 337 days.

(21) Appl. No.: 18/752,849

(22) Filed: Jun. 25, 2024

(65) Prior Publication Data

US 2025/0035373 A1 Jan. 30, 2025

(30) Foreign Application Priority Data

Jul. 25, 2023 (IN) ............................ 202321050027

(51) Int. Cl.
*F25D 29/00* (2006.01)
*G06N 7/01* (2023.01)

(52) U.S. Cl.
CPC .............. *F25D 29/00* (2013.01); *G06N 7/01* (2023.01)

(58) Field of Classification Search
CPC .................................. F25D 29/00; G06N 7/01
See application file for complete search history.

(56) References Cited

U.S. PATENT DOCUMENTS

2019/0147396 A1* 5/2019 Bohling ............... G06Q 10/087 705/28
2020/0302377 A1* 9/2020 Danducci ............... G01N 33/02
2022/0120693 A1* 4/2022 Dutta ..................... G01N 21/78

OTHER PUBLICATIONS

Chandrima Shrivastava et al., "Digital twins for selecting the optimal ventilated strawberry packaging based on the unique hygrothermal conditions of a shipment from farm to retailer," Postharvest Biology and Technology, 2023, https://engrxiv.org/preprint/view/2553.

(Continued)

*Primary Examiner* — Mark A Connolly
(74) *Attorney, Agent, or Firm* — Finnegan, Henderson, Farabow, Garrett & Dunner, LLP

(57) ABSTRACT

This disclosure relates generally to shelf life of produce and, more particularly, for predicting and enhancing shelf life of produce in storage facility. A significant quantity of produce such as fresh fruits and vegetable are lost before reaching the consumer, during its long-term storage in a warehouse or a storage facility. Many techniques have been employed to preserve-enhance the shelf life. However, the existing techniques do not explicitly consider factors such as air circulation, stacking of container, and respiration of the produce during shelf-life prediction. The disclosed techniques predict and enhance the shelf life of produce in storage facilities in several steps including determining a set of modelling parameters, determining a plurality of shelf-life parameters, predicting a shelf life of the produce based on generating a shelf-life prediction model, predicting a quality index and finally, enhancing the shelf-life of the produce based on an optimization technique.

20 Claims, 8 Drawing Sheets

(56) References Cited

OTHER PUBLICATIONS

Seraina Schudei et al., "Combining experiments and mechanistic modeling to compare ventilated packaging types for strawberries from farm to retailer," Food Packaging and Shelf Life, 2022, vol. 34, Elsevier, https://www.sciencedirect.com/science/article/pii/S2214289422001363.

Arwa Abougharib et al., "Remaining Shelf-Life Estimation of Fresh Fruits and Vegetables During Transportation," IEEE Access, 2023, vol. 11, IEEE, https://ieeexplore.ieee.org/document/10025733.

* cited by examiner

PREDICTING AND ENHANCING SHELF LIFE OF PRODUCE IN STORAGE

PRIORITY CLAIM

This U.S. patent application claims priority under 35 U.S.C. § 119 to: Indian patent application No. 202321050027, filed Jul. 25, 2023. The entire contents of the aforementioned application are incorporated herein by reference.

TECHNICAL FIELD

The disclosure herein generally relates to shelf life of produce in storage and, more particularly, for predicting and enhancing shelf life of produce in storage.

BACKGROUND

Freshly harvested products or produce such as fresh fruits and vegetables are perishable commodities. A significant quantity of produce that is freshly harvested is lost before it reaches the consumer during the supply chain. The major loss of produce occurs during its long-term storage in a warehouse. In supply chain management, during storage of produce in a storage facility the major challenges for managing the shelf life of the produce includes non-uniform ripening and quality of food, food wastage/spoilage or hot spot, moisture pockets and gas pockets ($C_2H_4$, $CO_2$) and issues with inventory management.

Considering the rate at which the products or produce perish, it is vital to understand the variation in the food quality at different facilities with time to minimize the wastage of food through real-time monitoring of food quality and dynamic control of food environment. Many techniques have been employed to enhance the shelf life and protect such products by preserving the freshness, texture and color of the fresh produce to make it fit for consumption.

Shelf life is defined as a recommended maximum time for which products or produce can be stored to retain the freshness, nutrition and quality of the produce. Hence the shelf-life assessment strategies must be carefully designed to predict as well as enhance the shelf life of the produce. One of the earliest means of enhancing the shelf life of produce has been refrigeration storage. However, most fresh produce when stored under reduced temperatures for prolonged periods shows adverse effects on the taste, odor, or quality of the product.

Conventional storage facilities are designed based on temperature and humidity requirement of the produce to be stored. Most of the storage chambers or warehouses are designed without optimizing the fluid flow across the chamber, therefore there is non-uniform distribution of cold air and temperature in the chamber that creates hot spots inside the warehouse thus damaging the produce stored in the area. Further, the formation of high humidity zones, pockets of $CO_2$ and ethylene during storage of produce due to respiration affect the quality and ripening of the produce. Also, random stacking of containers causes improper ventilation and non-uniform cooling degrades the quality of produce rapidly, creating wastage. Gas pockets generation in various areas is also a huge challenge in warehouses or inventory management. These factors such as air circulation, stacking of containers, and respiration of the produce are not usually considered during shelf-life prediction, thus making the current techniques not very efficient or effective for shelf-life prediction.

SUMMARY

Embodiments of the present disclosure present technological improvements as solutions to one or more of the above-mentioned technical problems recognized by the inventors in conventional systems. For example, in one embodiment, a method for predicting and enhancing shelf life of produce in storage facility is provided.

The system includes a memory storing instructions, one or more communication interfaces, and one or more hardware processors coupled to the memory via the one or more communication interfaces, wherein the one or more hardware processors are configured by the instructions to receive a plurality of inputs, via one or more hardware processors, wherein the plurality of inputs are associated with a plurality of produce and a storage facility, and the plurality of inputs comprises a produce information and a storage facility information, wherein: the produce information comprises a produce, a plurality of properties of the produce including a volume, a shape, a size, a weight, an initial surface temperature, harvesting details, and the storage facility information comprises information associated with the storage facility and includes: a plurality of containers and a type of each container from the plurality of containers, and a plurality of storage parameters comprising an inlet air temperature, an air flow rate, a set of environmental conditions and a produce harvesting details. The system is further configured to determine a set of modelling parameters for a produce from the plurality of produce, via the one or more hardware processors, based on a process modelling technique using the plurality of inputs, wherein the set of modelling parameters comprises a respiration of gases condition, a mass loss condition, a cumulative gas index and a heat source. The system is further configured to determine a plurality of shelf-life parameters for the produce and the storage facility using the set of modelling parameters, via the one or more hardware processors, based on a modelling technique wherein the plurality of shelf-life parameters comprises a respiration gases concentration, a temperature, a humidity, a mass loss, and a cumulative gas index for a predefined time interval. The system is further configured to predict a shelf life of the produce using the plurality of shelf-life parameters based on a data analysis technique, via the one or more hardware processors, wherein the data analysis technique comprises: generating a shelf-life prediction model based on a shelf-life prediction model technique, predicting a quality index using the shelf-life prediction model, and predicting the shelf life of the produce based on the quality index for the produce. The system is further configured to enhance the shelf-life of the produce based on an optimization technique, via the one or more hardware processors, wherein the shelf-life of the produce is enhanced by optimizing the plurality of storage parameters for the plurality of container based on the shelf-life.

In another aspect, a method for predicting and enhancing shelf life of produce in storage facility is provided. The method includes receiving a plurality of inputs wherein the plurality of inputs are associated with a plurality of produce and a storage facility, and the plurality of inputs comprises a produce information and a storage facility information, wherein: the produce information comprises a produce, a plurality of properties of the produce including a volume, a shape, a size, a weight, an initial surface temperature, harvesting details, and the storage facility information comprises information associated with the storage and includes: a plurality of containers and a type of each container from the plurality of containers, and a plurality of storage parameters comprising an inlet air temperature, an air flow rate, a set of environmental conditions and a produce harvesting details. The method includes determining a set of modelling parameters for a produce from the plurality of produce, based on a process modelling technique using the plurality of inputs, wherein the set of modelling parameters comprises a respiration of gases condition, a mass loss condition, a cumulative gas index and a heat source. The method includes determining a plurality of shelf-life parameters for the produce and the storage facility using the set of modelling parameters based on a modelling technique wherein the plurality of shelf-life parameters comprises a respiration gases concentration, a temperature, a humidity, a mass loss, and a cumulative gas index for a predefined time interval. The method includes predicting a shelf life of the produce using the plurality of shelf-life parameters based on a data analysis technique wherein the data analysis technique comprises generating a shelf-life prediction model based on a shelf-life prediction model technique, predicting a quality index using the shelf-life prediction model, and predicting the shelf life of the produce based on the quality index for the produce. The method includes enhancing the shelf-life of the produce based on an optimization technique wherein the shelf-life of the produce is enhanced by optimizing the plurality of storage parameters for the plurality of container based on the shelf-life.

In yet another aspect, a non-transitory computer readable medium for predicting and enhancing shelf life of produce in storage facility is provided. The method includes receiving a plurality of inputs wherein the plurality of inputs are associated with a plurality of produce and a storage facility, and the plurality of inputs comprises a produce information and a storage facility information, wherein: the produce information comprises a produce, a plurality of properties of the produce including a volume, a shape, a size, a weight, an initial surface temperature, harvesting details, and the storage facility information comprises information associated with the storage facility and includes: a plurality of containers and a type of each container from the plurality of containers, and a plurality of storage parameters comprising an inlet air temperature, an air flow rate, a set of environmental conditions and a produce harvesting details. The method includes determining a set of modelling parameters for a produce from the plurality of produce, based on a process modelling technique using the plurality of inputs, wherein the set of modelling parameters comprises a respiration of gases condition, a mass loss condition, a cumulative gas index and a heat source. The method includes determining a plurality of shelf-life parameters for the produce and the storage using the set of modelling parameters based on a modelling technique wherein the plurality of shelf-life parameters comprises a respiration gases concentration, a temperature, a humidity, a mass loss, and a cumulative gas index for a predefined time interval. The method includes predicting a shelf life of the produce using the plurality of shelf-life parameters based on a data analysis technique wherein the data analysis technique comprises generating a shelf-life prediction model based on a shelf-life prediction model technique, predicting a quality index using the shelf-life prediction model, and predicting the shelf life of the produce based on the quality index for the produce. The method includes enhancing the shelf-life of the produce based on an optimization technique wherein the shelf-life of the produce is enhanced by optimizing the plurality of storage parameters for the plurality of container based on the shelf-life.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
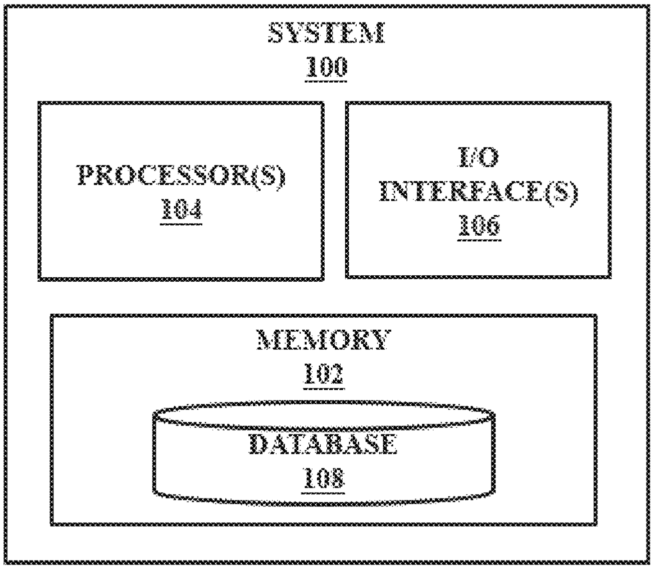
FIG. 1 illustrates an exemplary system for predicting and enhancing shelf life of produce in storage facility according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Referring now to the drawings, and more particularly to FIG. 1 through FIG. 7, where similar reference characters denote corresponding features consistently throughout the figures, there are shown preferred embodiments and these embodiments are described in the context of the following exemplary system and/or method.

FIG. 1 is an exemplary block diagram of a system 100 for predicting and enhancing shelf life of produce in storage facility in accordance with some embodiments of the present disclosure.

In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of the system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 is configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, a network cloud and the like.

The I/O interface(s) 106 can include a variety of software and hardware interfaces, for example, a web interface, a graphical user interface, a touch user interface (TUI) and the like and can facilitate multiple communications within a wide variety of networks N/W and protocol types, including wired networks, for example, LAN, cable, etc., and wireless networks, such as WLAN, cellular, or satellite. In an embodiment, the I/O interface(s) 106 can include one or more ports for connecting a number of devices (nodes) of the system 100 to one another or to another server.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

Further, the memory 102 may include a database 108 configured to include information regarding shelf life of produce in storage facility. The memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106.

Figure 2:
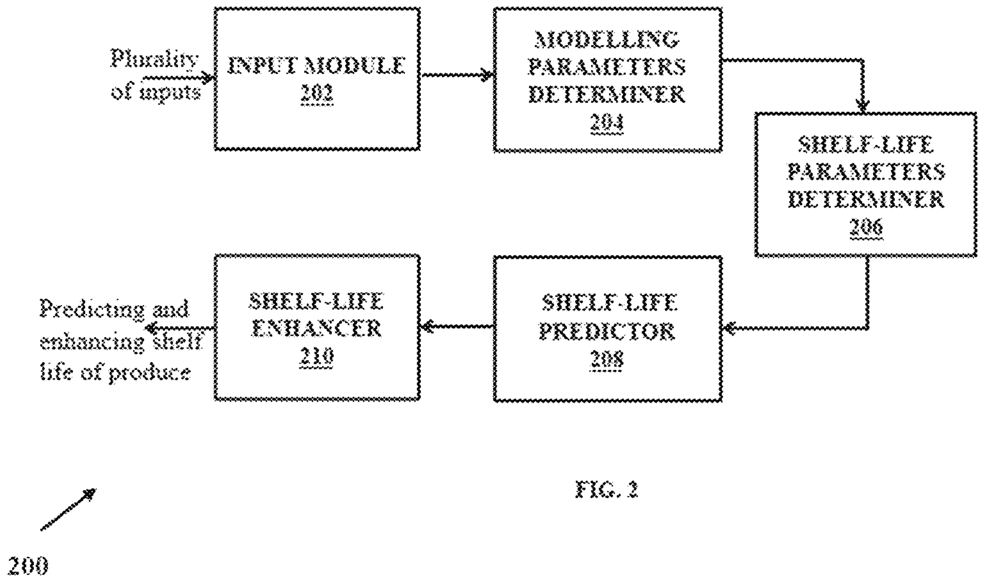
FIG. 2 is a functional block diagram for predicting and enhancing shelf life of produce in storage facility according to some embodiments of the present disclosure.
Figure 3A:
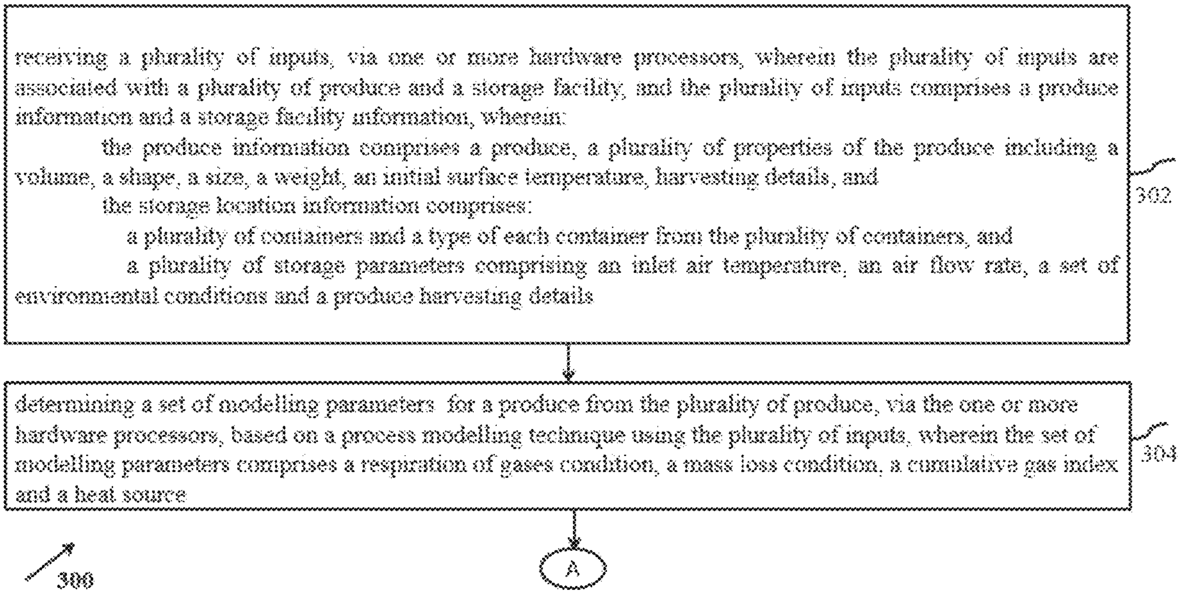
FIG. 3A and FIG. 3B is a flow diagram illustrating a method (300) for predicting and enhancing shelf life of produce in storage facility in accordance with some embodiments of the present disclosure.
Figure 3B:
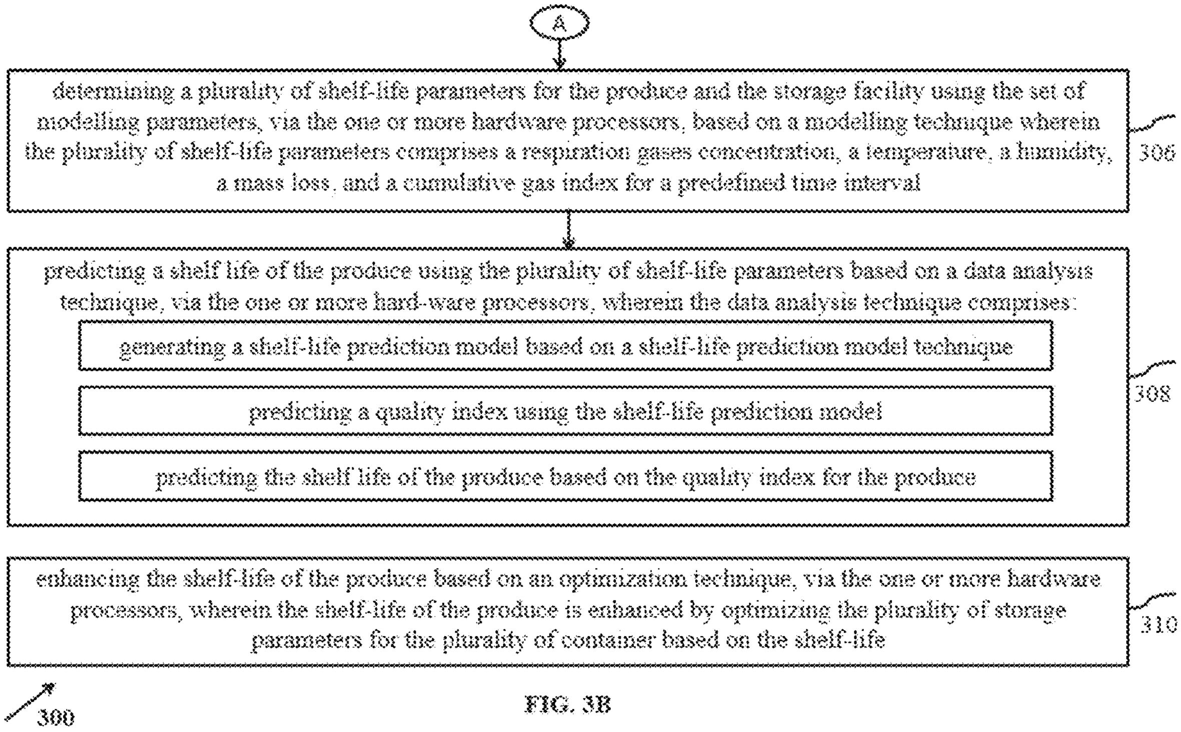

Functions of the components of system 100 are explained in conjunction with functional overview of the system 100 in FIG. 2 and flow diagram of FIG. 3A and FIG. 3B for predicting and enhancing shelf life of produce in storage facility The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

FIG. 2 is an example functional block diagram of the various modules of the system of FIG. 1, in accordance with some embodiments of the present disclosure. As depicted in the architecture, the FIG. 2 illustrates the functions of the modules of the system 100 that includes for predicting and enhancing shelf life of produce in storage facility.

As depicted in FIG. 2, the functional system 200 of the system 100 is configured for predicting and enhancing shelf life of produce in storage facility.

The system 200 comprises input module 202 configured for receiving a plurality of inputs, wherein the plurality of inputs is associated with a plurality of produce and a storage facility, and the plurality of inputs comprises a produce information and a storage facility information. The system further comprises a modelling parameters determiner 204 configured for determining a set of modelling parameters for a produce from the plurality of produce, based on a process modelling technique using the plurality of inputs. The system 200 further comprises a shelf-life parameters determiner 206 configured for determining a plurality of shelf-life parameters for the produce and the storage facility using the set of modelling parameters, based on a modelling technique. The system 200 further comprises a shelf-life predictor 208 configured for predicting a shelf life of the produce using the plurality of shelf-life parameters based on a data analysis technique, wherein the data analysis technique comprises: generating a shelf-life prediction model based on a shelf-life prediction model technique, predicting a quality index using the shelf-life prediction model, and predicting the shelf life of the produce based on the quality index for the produce. The system 200 further comprises a shelf-life enhancer 210 configured for enhancing the shelf-life of the produce based on an optimization technique, wherein the shelf-life of the produce is enhanced by optimizing the plurality of storage parameters for the plurality of containers based on the shelf-life.

The various modules of the system 100 and the functional blocks in FIG. 2 are configured for predicting and enhancing shelf life of produce in storage facility are implemented as at least one of a logically self-contained part of a software program, a self-contained hardware component, and/or, a self-contained hardware component with a logically self-contained part of a software program embedded into each of the hardware component that when executed perform the above method described herein.

Functions of the components of the system 200 are explained in conjunction with functional modules of the system 100 stored in the memory 102 and further explained in conjunction with flow diagram of FIGS. 3A-3B. The FIGS. 3A-3B with reference to FIG. 1, is an exemplary flow diagram illustrating a method 300 for recommending an emission reduction potential using the system 100 of FIG. 1 according to an embodiment of the present disclosure.

The steps of the method of the present disclosure will now be explained with reference to the components of the system 100 of FIG. 1 for predicting and enhancing shelf life of produce in storage facility and the modules 202-210 as depicted in FIG. 2 and the flow diagrams as depicted in FIGS. 3A-3B. Although process steps, method steps, techniques or the like may be described in a sequential order, such processes, methods and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

At step 302 of the method 300, a plurality of inputs are received at the input module 202. The plurality of inputs are associated with a plurality of produce and a storage facility, and the plurality of inputs comprises a produce information and a storage facility information.

The produce information comprises a produce, a plurality of properties of the produce including but not limited to a volume, a shape, a size, a weight, an initial surface temperature, a harvesting detail etc.

The storage facility information comprises information associated with:

(a) a plurality of containers and a type of each container from the plurality of containers, and (b) a plurality of storage parameters comprising an inlet air temperature, an air flow rate, a set of environmental conditions and a produce harvesting details.

In an embodiment, the storage facility information is one of a warehouse, or a moving air-conditioned vehicle. The plurality of produce comprises of one of a plurality of vegetables, a plurality of fruits, a variety of meat and a combination thereof.

At step 304 of the method 300, a set of modelling parameters is determined in by the modelling parameters determiner 204. The set of modelling parameters is determined for a produce from the plurality of produce based on a process modelling technique using the plurality of inputs. The set of modelling parameters comprises a respiration of gases condition, a mass loss condition, a cumulative gas index and a heat source.

In an embodiment, the process modelling technique comprises use of an enzyme kinetic model and a mass loss model and the cumulative gas index comprises a carbon dioxide ($CO_2$) gas index, an ethylene ($C_2H_4$) gas index, and a methane ($CH_4$) gas index.

The set of modelling parameters comprises:

The respiration of gases condition: the respiration of gases condition is determined based on an enzyme kinetic model. The respiration of gases condition is determined using the cumulative gas index. In an example scenario the cumulative gases used include—$O_2$ is oxygen gas. $CO_2$ is carbon dioxide gas. $C_2H_4$ is ethylene gas. $rO_{2max}$, $rCO_{2max}$, $rC_2H_{4max}$ are maximum rates of 02 consumption or $CO_2$ production and $C_2H_4$ production, $rO_2$ and $rCO_2$ are rates of $O_2$ consumption or $CO_2$ production, $K_{mO_2}$, $K_{mCO_2}$, $K_{mC_2H_4}$ are the dissociation constants of the enzyme-substrate complex, and $K_{muCO2}$ and $K_{mu'CO_2}$ are the inhibition constants due to $CO_2$, A is Arrhenius pre-exponential factor, $E_a$ is the activation energy $rO_{2max()}$ is the pre-exponential factor, R is the universal gas constant and T is the temperature. h is hill coefficient representing degree of cooperativity. $y_{O_2}$, $y_{CO_2}$ is mole fraction. ρ is density of produce. $V_{fruit}$ is volume of produce. $A_{surface}$ is surface area of produce. $MW_i$ is Molecular weight of gas component. P is pressure. T is temperature. m"i is mass flux of gas ($kg/m^2s$). i is gas (Oxygen, carbon dioxide, ethylene gas, methane gas and more)

$$m_i^n = (1.392E-15)\cdot r_i \cdot \rho_{fruit}\left(\frac{V_{fruit}}{A_{surface}}\right)\frac{\mathrm{MW}_i P}{T} \tag{1}$$

Where $r_i = \left( r_{O_2}, r_{CO_2}, r_{C_2H_4}\right.$ $$r_{O_2} = -\frac{rO_{2max}yO_2}{K_{mO_2} + yO_2\left(1 + \frac{yCO_2}{K_{muCO_2}}\right)}\ (\mathrm{cm^3/kgday})$$

$$r_{CO_2} = -\frac{rCO_{2max}yO_2}{K_{mO_2} + yO_2\left(1 + \frac{yCO_2}{K_{mu'CO_2}}\right)}\ (\mathrm{cm^3/kgday})$$

$$r_{C_2H_4} = -\frac{rC_2H_{4max}\left(yO_2^h\right)}{K_{mC_2H_4} + yO_2\left(1 + \frac{yCO_2}{K_{muCO_2}}\right)}\ (\mathrm{cm^3/kgday})$$

$$r_{O_{2max}} = A_{O_{2max}}\mathrm{Exp}\left(-\frac{E_a}{RT}\right)$$

The Cumulative Gas Indexes

The cumulative carbon-di-oxide ($CO_2$) index is determined based on a total carbon-di-oxide ($CO_2$) generated by the produce based on the enzyme kinetic model and is expressed as shown below:

$$\text{Cumulative gas index}-rCO_2 * \text{Mass of fruit} \tag{2}$$

Alternatively, the cumulative gas index is also expressed as a total mass of gas accumulated for given time and give surface area of the produce, expressed as shown below:

$$\text{Cumulative gas index of ethylene} = \int\int m_i'' dAdt \tag{3}$$

Where m"i is mass flux of ethylene gas produced from small surface area (dA) for small time duration (dt)

$$\text{Cumulative gas index of methane} = \int\int m_i'' dAdt \tag{4}$$

Where m"i is mass flux of methane gas produced from small surface area (dA) for small time duration (dt)

The mass loss condition: the mass loss condition is determined based on a sum of mass loss due to transpiration (moisture loss $M_t$) and respiration (respiration mass loss $M_r$) (Rate of glucose oxidation). Transpiration is vapor pressure deficit (VPD), which is the difference between vapor pressure of fruit surface (Ps) and headspace air (Pin). The mass loss condition is expressed as shown below:

$$\frac{dM_t}{dt} = A_s\frac{VPD}{(1/K_s + 1/K_a)},\ VPD = P_s - P_{in} = P_{in}^{sat}a_w - P_{in}^{sat}RH_{in}/100 \tag{5}$$

Wherein, $M_t$ is Moisture loss of produce, $K_s$ is mass transfer coefficient of fruit skin, $K_a$ is mass transfer coefficient of thin air layer, $A_s$ is surface area of produce, $P_s$ is a function of saturation vapour pressure $$(P_s^{sat}),$$

$$P_{in}^{sat}$$

is saturation vapour pressure, $a_w$ is water activity of fresh produce, and $$\frac{dM_r}{dt} = \frac{180-108}{264}W_pR_{CO_2} \tag{6}$$

$RH_{in}$ is relative humidity.

Wherein, $M_r$ is respiration mass loss of produce,

Wp is Mass of produce (kg), and $RCO_2$ is rate of respiration of $CO_2$.

The heat source: The heat source is generated from respiration of produce, wherein the heat is generated due to decomposition of glucose in the produce as shown below:

$$C_6H_{12}O_6 + 6\,O_2 \rightarrow 6\,CO_2 + 6\,H_2O + 2667 kJ \tag{7}$$

During the respiration process, 1 mole of glucose need 6 moles of oxygen to oxidise, and release 2667 KJ amount of heat.

At step 306 of the method 300, a plurality of shelf-life parameters are determined for the produce and the storage facility using the set of modelling parameters in the shelf-life parameters determiner 206. The plurality of shelf-life parameters are determined based on a modelling technique. The plurality of shelf-life parameters may comprise respiration gases concentration, a temperature, a humidity, a mass loss, and a cumulative gas index for a predefined time interval.

In an embodiment, the modelling technique comprises one of a Computational fluid dynamic (CFD), a Physics-informed neural networks (PINNs), and a Smoothed-particle hydrodynamics (SPH).

Figure 4A:
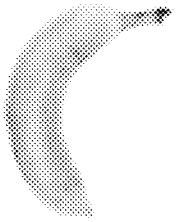
FIGS. 4A, 4B, 4C illustrates creation of geometry in accordance with some embodiments of the present disclosure.
Figure 4B:
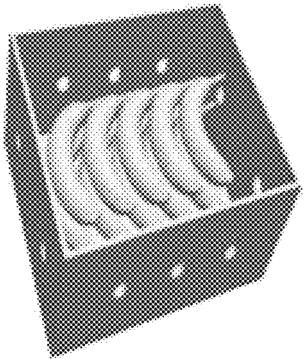
Figure 4C:
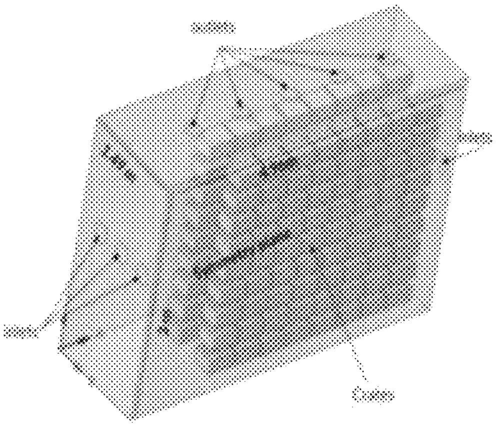

In an example scenario, the plurality of shelf-life parameters are determined using the set of modelling parameters based on CFD technique in several steps including:

(a) Creation of a geometry of each of the produce and the storage parameter: The geometry is created depending on a produce information and a storage facility information. Geometry can be created in any 3D software/tool which is compatible with any computational fluid dynamic (CFD) tool. An example scenario of creation of geometry is shown in FIG. 4A to FIG. 4C, wherein FIG. 4A is a produce, FIG. 4B is the container in which the produce is arranged and FIG. 4C.

Figure 5:
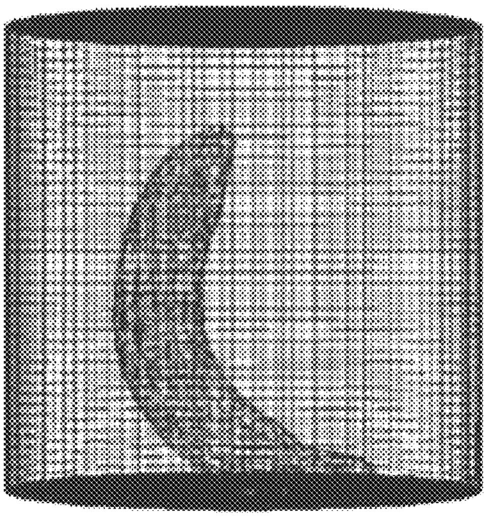
FIG. 5 illustrates generation of a numerical grid for the geometry in accordance with some embodiments of the present disclosure.

(b) Generation of a numerical grid for the geometry of each of the produce and the storage parameter: The numerical grid is generated for the geometry with a meshing tool such as a OpenFOAM. The meshing tool provides good quality of numerical grid and large-scale mesh problems can be solved with good accuracy. An example scenario of the numerical grid is illustrated in FIG. 5.

(c) Applying the set of modelling parameters to the numerical grid based on the plurality of inputs: The set of modelling parameters are applied to the numerical grid. The set of modelling parameters includes inlet airflow rate, temperature, humidity, respiration model, heat source and mass loss model in the modelling technique (CFD, Ansys fluent).

(d) Simulating solves partial differential equations which includes physical laws of fluid dynamic. Simulations are performed over a duration for which the produce is stored in the storage facility.

Figure 6:
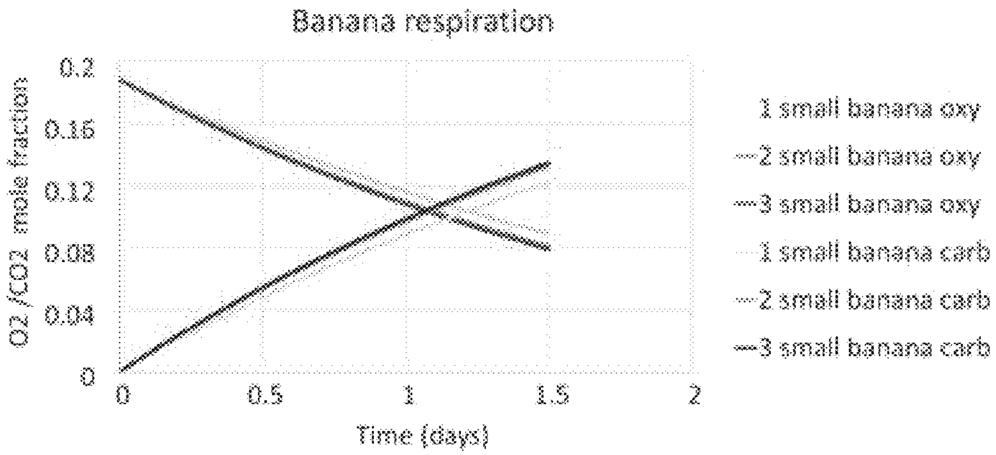
FIG. 6 illustrates prediction of modelling parameters for storage duration in accordance with some embodiments of the present disclosure.

(e) Post-processing: Post processing involves prediction of modelling parameters for storage duration. These modelling parameters are visualized and analyzed in terms of tables, graphs, picture and video as illustrated in FIG. 6. Mole fraction of $CO_2$ is increases from 0 to 0.12 for storage of 1.5 days as $CO_2$ is produced during respiration process as well as More fraction of $CO_2$ is increasing with quantity. These plots are generated through simulation and validated.

At step 308 of the method 300, a shelf life of the produce is predicted in the shelf-life predictor 208. The shelf life of the produce is predicted using the plurality of shelf-life parameters based on a data analysis technique.

In an embodiment, the shelf-life of the product is represented by a quality index indicating a number of days that the produce is fresh and safe for use. The data analysis comprises one of a machine learning model, a data-based model, and an empirical model.

The data analysis technique comprises of several steps including:

(a) generating a shelf-life prediction model based on a shelf-life prediction model technique. The shelf-life prediction technique involves machine learning algorithm such as Multilinear regression (MLR) method, expressed as shown below:

$$\text{shelf-life prediction model} = k_1 \times \text{environmental conditions} + k_2 \times \text{cumulative gas index} + k_3 \times \text{mass loss} + k_4 \times \text{Heat source} \tag{8}$$

Wherein:

$k_1$, $k_2$, $k_3$ and $k_4$ are un-known coefficients determined with MLR method, environmental conditions include surrounding temperature, humidity, air flow rate, cumulative gas index includes $CO_2$, $C_2H_4$, $CH_4$ gases produced during respiration, mass loss include change in mass for given duration of storage, and heat source include amount of heat generated during the respiration from the produce.

(b) predicting a quality index using the shelf-life prediction model. The quality index is assigned to produce and/or container based on the shelf-life prediction model value. The quality index is Bad quality produce, poor quality of produce, good quality of produce and premium quality of produce.

(c) Predicting the shelf life of the produce based on the quality index for the produce. The shelf-life is determined based on produce and quality index. In an example scenario: Considering an example for shelf-life of strawberry (around 7 days stored at 5° C.), the quality index, shelf life is determined as follows:

bad quality produce (1-2 days)

poor quality produce (2-4 days)

Good quality produce (4-6 days)

Premium quality produce (6-8 days)

At step 310 of the method 300, the shelf-life of the produce is enhanced in the shelf-life enhancer 210. The shelf-life of the produce is enhanced based on an optimization technique. The shelf-life of the produce is enhanced by optimizing the plurality of storage parameters for the plurality of container based on the shelf-life.

Figure 7:
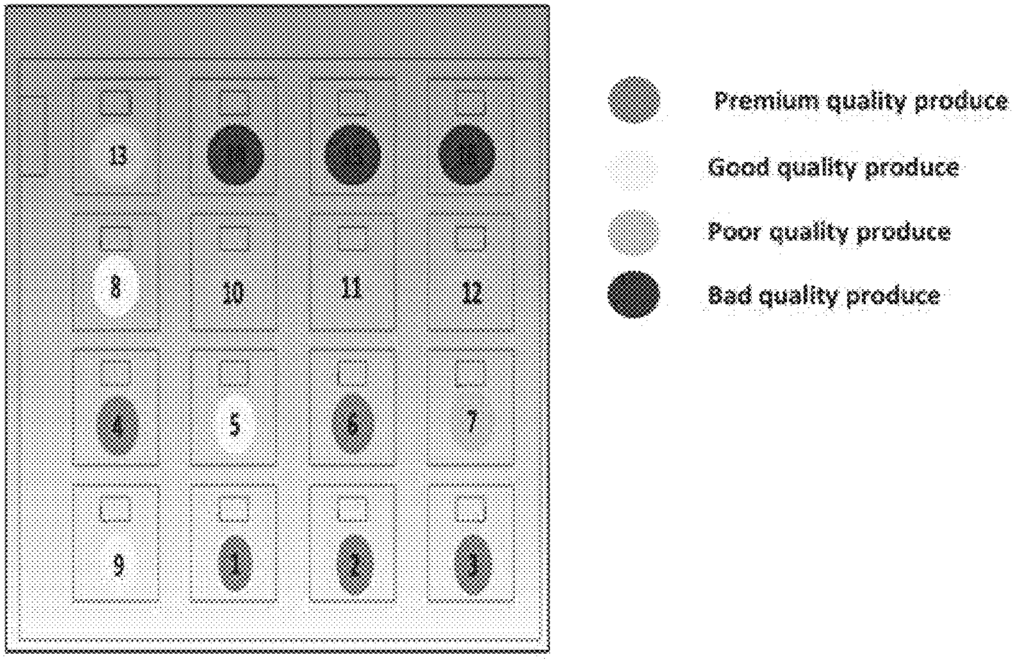
FIG. 7 illustrates assignment of quality index in accordance with some embodiments of the present disclosure.

In an embodiment, the shelf-life of the produce is enhanced in several steps including:

(a) Assigning a quality index for each of the plurality of container:

The quality index is assigned to produce and/or container based on the shelf-life prediction model value. Quality index may be assigned as a bad quality produce, a poor quality of produce, a good quality of produce and a premium quality of produce. An example is illustrated in FIG. 7

(b) optimizing the plurality of storage parameters to enhance the shelf-life of the produce based on the assigned quality index using the optimization technique.

In an embodiment, the optimization technique comprises a bayesian optimization, a gradient base optimization, a genetic algorithm, and an exact method. The optimization techniques are designed to optimize the environmental conditions for every container. The environmental conditions such as a temperature, a humidity, and an airflow are kept within a pre-defined limit by optimizing stacking of container.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

This disclosure relates generally to shelf life of produce and, more particularly, for predicting and enhancing shelf life of produce in storage facility. A significant quantity of produce such as fresh fruits and vegetable is lost before it reaches the consumer, due during its long-term storage in a warehouse or a storage=facility. Many techniques have been employed to preserve-enhance the shelf life. However, the existing techniques do not explicitly consider factors such as air circulation, stacking of container, and respiration of the produce during shelf-life prediction. The disclosed techniques predict and enhance the shelf life of produce in storage facility in several steps including determining a set of modelling parameters, determining a plurality of shelf-life parameters, predicting a shelf life of the produce based on generating a shelf-life prediction model, predicting a quality index and finally, enhancing the shelf-life of the produce based on an optimization technique.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:

receiving a plurality of inputs, wherein the plurality of inputs are associated with a plurality of produce and a storage facility, and the plurality of inputs comprises a produce information and a storage facility information, wherein:

the produce information comprises a produce, a plurality of properties of the produce including a volume, a shape, a size, a weight, an initial surface temperature, harvesting details, and the storage facility information comprises:

a plurality of containers and a type of each container from the plurality of containers, and a plurality of storage parameters comprising an inlet air temperature, an air flow rate, a set of environmental conditions and a produce harvesting details;

determining a set of modelling parameters for a produce from the plurality of produce, based on a process modelling technique using the plurality of inputs, wherein the set of modelling parameters comprises a respiration of gases condition, a mass loss condition, a cumulative gas index and a heat source;

determining a plurality of shelf-life parameters for the produce and the storage facility using the set of modelling parameters, based on a modelling technique wherein the plurality of shelf-life parameters comprises a respiration gases concentration, a temperature, a humidity, a mass loss, and a cumulative gas index for a predefined time interval;

predicting a shelf life of the produce using the plurality of shelf-life parameters based on a data analysis technique, wherein the data analysis technique comprises:

generating a shelf-life prediction model based on a shelf-life prediction model technique, predicting a quality index using the shelf-life prediction model, and predicting the shelf life of the produce based on the quality index for the produce, and enhancing the shelf-life of the produce based on an optimization technique, wherein the shelf-life of the produce is enhanced by optimizing the plurality of storage parameters for the plurality of container based on the shelf-life.

2. The method as claimed in claim 1, wherein the storage facility is one of a warehouse, or a moving air-conditioned vehicle and the plurality of produce comprises of one of a plurality of vegetables, a plurality of fruits, a variety of meat and a combination thereof.

3. The method as claimed in claim 1, wherein the process modelling technique comprises an enzyme kinetic model and a mass loss model and the cumulative gas index comprises a carbon dioxide gas index, an ethylene gas index, and a methane gas index.

4. The method as claimed in claim 1, wherein the modelling technique comprises one of a Computational fluid dynamic (CFD), a Physics-informed neural networks (PINNs), and a Smoothed-particle hydrodynamics (SPH).

5. The method as claimed in claim 1, wherein the plurality of shelf-life parameters are determined using the set of modelling parameters based on Computational fluid dynamic (CFD) technique in several steps including creation of a geometry of each of the produce and the storage parameter, generating a mesh for the geometry of each of the produce and the storage parameter, applying the set of modelling parameters to the mesh based on the plurality of inputs, and simulation and post-processing.

6. The method as claimed in claim 1, wherein the shelf-life of the product is represented by a quality index indicating a number of days that the produce is fresh and safe for use and the shelf-life prediction model technique comprises one of a machine learning model, a data-based model, and an empirical model.

7. The method as claimed in claim 1, wherein the shelf-life of the produce is enhanced in a plurality of steps including (a) assigning a quality index for each of the plurality of crates and (b) optimizing the plurality of storage parameters to enhance the shelf-life of the produce based on the assigned quality index using the optimization technique, wherein the optimization technique comprises a bayesian optimization, a gradient base optimization, a genetic algorithm, and an exact method.

8. A system, comprising:

a memory storing instructions;

one or more communication interfaces; and one or more hardware processors coupled to the memory via the one or more communication interfaces, wherein the one or more hardware processors are configured by the instructions to:

receive a plurality of inputs, via one or more hardware processors, wherein the plurality of inputs are associated with a plurality of produce and a storage facility, and the plurality of inputs comprises a produce information and a storage facility information, wherein:

the produce information comprises a produce, a plurality of properties of the produce including a volume, a shape, a size, a weight, an initial surface temperature, harvesting details, and the storage facility information comprises:

a plurality of containers and a type of each container from the plurality of containers, and a plurality of storage parameters comprising an inlet air temperature, an air flow rate, a set of environmental conditions and a produce harvesting details;

determine a set of modelling parameters for a produce from the plurality of produce, via the one or more hardware processors, based on a process modelling technique using the plurality of inputs, wherein the set of modelling parameters comprises a respiration of gases condition, a mass loss condition, a cumulative gas index and a heat source;

determine a plurality of shelf-life parameters for the produce and the storage facility using the set of modelling parameters, via the one or more hardware processors, based on a modelling technique wherein the plurality of shelf-life parameters comprises a respiration gases concentration, a temperature, a humidity, a mass loss, and a cumulative gas index for a predefined time interval;

predict a shelf life of the produce using the plurality of shelf-life parameters based on a data analysis technique, via the one or more hardware processors, wherein the data analysis technique comprises:

generating a shelf-life prediction model based on a shelf-life prediction model technique, predicting a quality index using the shelf-life prediction model, and predicting the shelf life of the produce based on the quality index for the produce, and enhance the shelf-life of the produce based on an optimization technique, via the one or more hardware processors, wherein the shelf-life of the produce is enhanced by optimizing the plurality of storage parameters for the plurality of container based on the shelf-life.

9. The system as claimed in claim 8, wherein the storage facility is one of a warehouse, or a moving air-conditioned vehicle and the plurality of produce comprises of one of a plurality of vegetables, a plurality of fruits, a variety of meat and a combination thereof.

10. The system as claimed in claim 8, wherein the process modelling technique comprises an enzyme kinetic model and a mass loss model and the cumulative gas index comprises a carbon dioxide gas index, an ethylene gas index, and a methane gas index.

11. The system as claimed in claim 8, wherein the modelling technique comprises one of a Computational fluid dynamic (CFD), a Physics-informed neural networks (PINNs), and a Smoothed-particle hydrodynamics (SPH).

12. The system as claimed in claim 8, wherein the plurality of shelf-life parameters are determined using the set of modelling parameters based on Computational fluid dynamic (CFD) technique in several steps including creation of a geometry of each of the produce and the storage parameter, generating a mesh for the geometry of each of the produce and the storage parameter, applying the set of modelling parameters to the mesh based on the plurality of inputs, and simulation and post-processing.

13. The system as claimed in claim 8, wherein the shelf-life of the product is represented by a quality index indicating a number of days that the produce is fresh and safe for use and the shelf-life prediction model technique comprises one of a machine learning model, a data-based model, and an empirical model.

14. The system as claimed in claim 8, wherein the shelf-life of the produce is enhanced in a plurality of steps including (a) assigning a quality index for each of the plurality of crates and (b) optimizing the plurality of storage parameters to enhance the shelf-life of the produce based on the assigned quality index using the optimization technique, wherein the optimization technique comprises a bayesian optimization, a gradient base optimization, a genetic algorithm, and an exact method.

15. One or more non-transitory machine-readable information storage mediums comprising one or more instructions which when executed by one or more hardware processors cause:

receiving a plurality of inputs, wherein the plurality of inputs are associated with a plurality of produce and a storage facility, and the plurality of inputs comprises a produce information and a storage facility information, wherein:

the produce information comprises a produce, a plurality of properties of the produce including a volume, a shape, a size, a weight, an initial surface temperature, harvesting details, and the storage facility information comprises:

a plurality of containers and a type of each container from the plurality of containers, and a plurality of storage parameters comprising an inlet air temperature, an air flow rate, a set of environmental conditions and a produce harvesting details;

determining a set of modelling parameters for a produce from the plurality of produce, based on a process modelling technique using the plurality of inputs, wherein the set of modelling parameters comprises a respiration of gases condition, a mass loss condition, a cumulative gas index and a heat source;

determining a plurality of shelf-life parameters for the produce and the storage facility using the set of modelling parameters, based on a modelling technique wherein the plurality of shelf-life parameters comprises a respiration gases concentration, a temperature, a humidity, a mass loss, and a cumulative gas index for a predefined time interval;

predicting a shelf life of the produce using the plurality of shelf-life parameters based on a data analysis technique, wherein the data analysis technique comprises:

generating a shelf-life prediction model based on a shelf-life prediction model technique, predicting a quality index using the shelf-life prediction model, and predicting the shelf life of the produce based on the quality index for the produce, and enhancing the shelf-life of the produce based on an optimization technique, wherein the shelf-life of the produce is enhanced by optimizing the plurality of storage parameters for the plurality of container based on the shelf-life.

16. The one or more non-transitory machine-readable information storage mediums of claim 15, wherein the storage facility is one of a warehouse, or a moving air-conditioned vehicle and the plurality of produce comprises of one of a plurality of vegetables, a plurality of fruits, a variety of meat and a combination thereof.

17. The one or more non-transitory machine-readable information storage mediums of claim 15, wherein the process modelling technique comprises an enzyme kinetic model and a mass loss model and the cumulative gas index comprises a carbon dioxide gas index, an ethylene gas index, and a methane gas index, and wherein the modelling technique comprises one of a Computational fluid dynamic (CFD), a Physics-informed neural networks (PINNs), and a Smoothed-particle hydrodynamics (SPH).

18. The one or more non-transitory machine-readable information storage mediums of claim 15, wherein the plurality of shelf-life parameters are determined using the set of modelling parameters based on Computational fluid dynamic (CFD) technique in several steps including creation of a geometry of each of the produce and the storage parameter, generating a mesh for the geometry of each of the produce and the storage parameter, applying the set of modelling parameters to the mesh based on the plurality of inputs, and simulation and post-processing.

19. The one or more non-transitory machine-readable information storage mediums of claim 15, wherein the shelf-life of the product is represented by a quality index indicating a number of days that the produce is fresh and safe for use and the shelf-life prediction model technique comprises one of a machine learning model, a data-based model, and an empirical model.

20. The one or more non-transitory machine-readable information storage mediums of claim 15, wherein the shelf-life of the produce is enhanced in a plurality of steps including (a) assigning a quality index for each of the plurality of crates and (b) optimizing the plurality of storage parameters to enhance the shelf-life of the produce based on the assigned quality index using the optimization technique, wherein the optimization technique comprises a bayesian optimization, a gradient base optimization, a genetic algorithm, and an exact method.

* * * * *